(12) United States Patent
Weber et al.

(10) Patent No.: US 6,521,756 B2
(45) Date of Patent: Feb. 18, 2003

(54) PROCESS FOR PREPARING PERYLENE-3,4, 9,10-TETRACARBOXYLIC DIIMIDE IN TRANSPARENT PIGMENT FORM

(75) Inventors: Joachim Weber, Frankfurt am Main (DE); Gerhard Wilker, Mörfelden-Walldorf (DE); Manfred Urban, Wiesbaden (DE); Martin Böhmer, Neu-Anspach (DE); Erwin Dietz, Königstein (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/777,211

(22) Filed: Feb. 5, 2001

(65) Prior Publication Data

US 2001/0016656 A1 Aug. 23, 2001

(30) Foreign Application Priority Data

Feb. 5, 2000 (DE) .......................................... 100 05 186

(51) Int. Cl.$^7$ .......................... C07D 471/06; C09B 5/62; C09B 67/04
(52) U.S. Cl. ............................. 546/37; 546/36; 546/37; 106/498
(58) Field of Search ....................... 546/37, 36; 106/498

(56) References Cited

U.S. PATENT DOCUMENTS

| | | | |
|---|---|---|---|
| 3,615,800 A | 10/1971 | Spietschka et al. ........... 546/37 |
| 3,752,688 A | 8/1973 | Fuchs et al. .................... 546/37 |
| 3,976,649 A | 8/1976 | Fabian et al. ................... 56/37 |
| 4,189,582 A | * 2/1980 | Hoch et al. ..................... 546/37 |
| 4,298,526 A | 11/1981 | Sappok et al. ................. 546/37 |
| 4,431,806 A | 2/1984 | Spietschka et al. ........... 546/37 |
| 4,588,814 A | 5/1986 | Spietschka et al. ........... 546/37 |
| 4,846,892 A | 7/1989 | Henning et al. ............... 546/37 |
| 4,986,852 A | 1/1991 | Dietz et al. .................... 546/37 |
| 5,062,577 A | 11/1991 | Schmitt et al. ................ 546/37 |
| 5,123,966 A | 6/1992 | Dietz et al. ..................... 56/37 |
| 5,145,964 A | 9/1992 | Schütze et al. ................ 546/37 |
| 5,626,662 A | 5/1997 | Urban ........................... 546/37 |
| 5,662,739 A | 9/1997 | Urban et al. ................... 546/37 |
| 5,800,607 A | 9/1998 | Schnaitamnn et al. ........ 546/37 |
| 5,948,910 A | 9/1999 | Bauer et al. ................... 544/198 |
| 5,958,129 A | 9/1999 | Urban et al. ................... 546/37 |
| 6,221,150 B1 | 4/2001 | Weber et al. .................. 546/37 |
| 6,174,361 B1 | * 1/2002 | Urban et al. ................... 106/498 |
| 6,409,816 B1 | 6/2002 | Weber et al. .................. 106/494 |
| 6,413,309 B1 | 7/2002 | Weber et al. .................. 106/493 |

FOREIGN PATENT DOCUMENTS

| | | |
|---|---|---|
| DE | 386 057 | 12/1923 |
| DE | 1 619 531 | 2/1971 |
| DE | 20 43 820 | 3/1972 |
| DE | 23 16 536 | 10/1974 |
| DE | 28 51 752 | 6/1980 |
| DE | 37 16 587 | 4/1988 |
| DE | 40 07 728 | 9/1991 |
| EP | 0 039 912 | 11/1981 |
| EP | 0 123 256 | 10/1984 |
| EP | 0 260 648 | 3/1988 |
| EP | 0 321 919 | 6/1989 |
| EP | 0 366 062 | 5/1990 |
| EP | 0 662 497 | 7/1995 |
| EP | 0 678 559 | 10/1995 |
| EP | 0 753 544 | 1/1997 |
| EP | 0 864 613 | 9/1998 |
| EP | 0 937 724 | 8/1999 |
| EP | 0 979 846 | 2/2000 |

OTHER PUBLICATIONS

EPO Search Report for EP Application No. 01101319, mail date Sep. 19, 2001.
U.S. patent application No. 09/255,252.

* cited by examiner

Primary Examiner—Alan L. Rotman
Assistant Examiner—Janet L Coppins
(74) Attorney, Agent, or Firm—Anthony A. Bisulca

(57) ABSTRACT

The present invention provides a process for preparing transparent perylimide pigments of the formula (I)

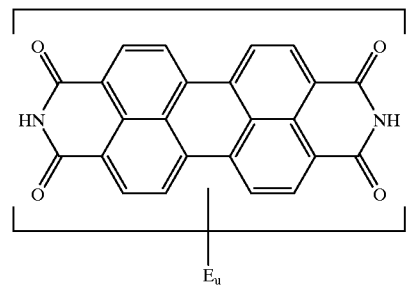

in which
  u is a number from 0 to 8 and, if u>0,
  E is a chlorine or bromine atom and, where u>1, may be a combination thereof, which comprises wet-grinding a crude perylimide pigment in a liquid medium in a stirred ballmill operated at a power density of from 1.0 kW per liter of milling space and at a stirrer tip speed of more than 12 m/s under the action of grinding media having a diameter of less than or equal to 0.9 mm, and isolating the resulting pigment.

10 Claims, No Drawings

PROCESS FOR PREPARING PERYLENE-3,4, 9,10-TETRACARBOXYLIC DIIMIDE IN TRANSPARENT PIGMENT FORM

CROSS-REFERENCES TO RELATED APPLICATIONS

The present invention is described in the German priority application No. DE-1 000 5186.3, filed May 2, 2000, which is hereby incorporated by reference as is fully disclosed herein.

FIELD OF THE INVENTION

The present invention relates to a particularly environment-friendly and economic process for preparing transparent perylene-3,4,9,10-tetracarboxylic diimide pigments of formula (I)

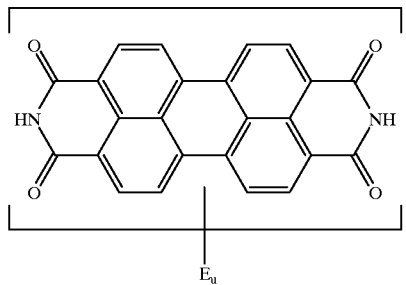

(I)

in which u is a number from 0 to 8 and, if u>0,

E is a chlorine or bromine atom and, where u>1, may be a combination thereof.

BACKGROUND OF THE INVENTION

In the pigmentation of automotive finishes, especially the metallic finishes, there is a need for pigments which with a high transparency and clean hue give strongly colored and highly glossy finishes. The pigment concentrates and the paints must be of low viscosity and must not exhibit pseudoplasticity. Moreover, very good fastness properties are demanded, especially good weather fastness.

Depending on the synthesis route, organic pigments are obtained in coarsely crystalline or finely divided form. Crude pigments obtained in coarsely crystalline form require fine division before being used. Examples of such fine division processes are grinding on roll mills or vibratory mills, which may be performed wet or dry, with or without grinding aids such as salt, for example; kneading, revatting, reprecipitation from sulfuric acid or polyphosphoric acid, for example (acid pasting), and suspending in sulfuric acid or polyphosphoric acid, for example (acid swelling).

In the case of perylene-3,4,9,10-tetracarboxylic diimide (referred to below as perylimide), neither the prepigments obtained from a synthesis nor the prepigments obtained in finely divided form from a fine division known to date may be used directly as pigments, since in the course of processing and especially in the course of drying they have a very strong tendency to form aggregates and agglomerates, leading to poor dispersibility, which results, for example, in a loss of color strength. Moreover, perylimide pigments exhibit a very strong tendency to flocculate in paints. Both phenomena result in performance properties which no longer satisfy the present-day requirements.

Perylimide has been used for a long time as an organic brown to reddish violet pigment (C.I. Pigment Violet 29, C.I. No. 71129). The suitability of the halogenated derivatives as pigments is also known. The crude pigment is prepared either by reacting 1,8-naphthalenedicarboximide in alkali metal hydroxide melts and then oxidizing the resultant leuco form, as described for example in EP-A-0 123 256, or by condensing perylene-3,4,9,10-tetracarboxylic acid or its anhydrides or carboxylic salts (called peracid below) with ammonia, as described for example in DE-A-386 057. The preparation of the halogenated derivatives is described, for example, in EP-A-0 260 648. The following processes are described for converting the resultant perylimides into a coloristically useful pigment form:

DE-A-16 19 531 describes the conversion of crude perylimide into a pigment by grinding in inert organic solvents and drying to remove the solvent. The process is costly since it necessitates a high level of expenditure on apparatus; furthermore, the solvent must be regenerated.

DE-A-20 43 820 describes a wet grinding process in an aqueous-alkaline medium. The pigments obtained under the stated conditions, however, no longer satisfy present-day requirements.

DE-A-23 16 536 describes a two-stage process for preparing perylimide pigments by means of dry grinding of the crude pigment followed by a deagglomeration and recrystallization step, either by finishing in the presence of amines or amides, or by suspending the millbase in sulfuric acid (acid swelling). The amines or amides used may lead to incompatibilities in certain applications, so that the pigments are not universally applicable.

DE-A-28 51 752 describes a multistage process for conditioning organic pigments; perylimide, among others, is mentioned as an example: dry grinding is conducted in the presence of small amounts of acid, followed in a second step by a solvent finish comprising recrystallization of the agglomerates formed in the course of grinding. Dry grinding in the presence of acid imposes extreme requirements on the material of the milling equipment used; furthermore, it is virtually impossible in practice to prevent dust contamination of operating personnel and of the environment.

EP-A-0 039 912 discloses a process for preparing perylimides and halogenation products derived from them in pigment form by purifying the crude pigment via the sulfate stage and finely dividing it, then carrying out dry grinding for the purpose of deagglomeration, and then, if desired, conducting a solvent finish. This is a multistage process in the course of which large amounts of sulfuric acid are produced and must be disposed of.

EP-A-0 366 062 discloses a process for preparing halogenated perylimides and mixed crystals of halogenated perylimides of high hiding power.

According to DE 40 07 728, finely divided perylimide pigments are subjected to conditioning in the presence of organic solvents. This is a two-stage process. The preferred embodiment describes the use of carboxylic esters which following the finish are saponified and passed off into the wastewater.

EP-A-0 678 559 describes a two-stage process for the fine division of crude pigments. First of all a dry grinding operation is conducted, followed by wet grinding. The latter is required in order to disperse the agglomerated millbase. The two-stage procedure leads to increased costs and to long production cycles, dry grinding being hampered by the disadvantages described.

There was a need to prepare transparent perylimide pigments in a simple, cost-effective and environmentally friendly manner.

SUMMARY OF THE INVENTION

It has now been found that transparent perylimide pigments of formula (I) having advantageous coloristic and rheological properties may be prepared in a simple and environmentally friendly way from crude perylimide pigments by means of a special beadmilling operation with high energy density.

DESCRIPTION OF THE PREFERRED EMBODIMENTS

The present invention provides a process for preparing transparent perylimide pigments of the formula (I)

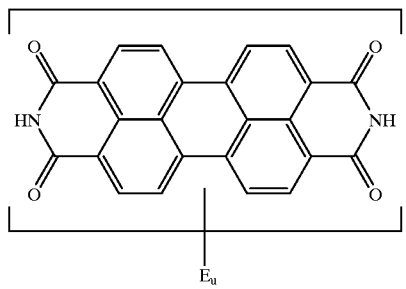

(I)

in which
u is a number from 0 to 8 and, if u>0,
E is a chlorine or bromine atom and, where u>1, may be a combination thereof, which comprises wet-grinding a crude perylimide pigment in a liquid medium in a stirred ballmill operated at a power density of from 1.0 kW per liter of milling space and at a stirrer peripheral speed of more than 12 m/s under the action of grinding media having a diameter of less than or equal to 0.9 mm, and isolating the resulting pigment.

The crude perylimide pigments for this process may have been prepared either by the route of the reaction of 1,8-naphthalenedicarboximide in alkali metal hydroxide melts with subsequent oxidation of the leuco form or by condensation from peracid, as defined above, with ammonia.

The crude, coarsely crystalline perylimide pigments obtainable from the synthesis, or finely crystalline perylimide prepigments, may be supplied in powder form or advantageously, with or without isolation beforehand, as a suspension, or in the form of an as-synthesized moist presscake, without further drying, to the wet grinding operation. It is also possible to purify the crude perylimide pigments, for example, by recrystallization or by extractive stirring with, for example, sulfuric acid.

The preparation of transparent perylimide pigments in accordance with the invention is surprisingly achieved without dry grinding beforehand. Examples of stirred ballmills which are suitable for conducting the wet grinding of the invention are those which are designed for batchwise and continuous operation, which have a cylindrical or hollow-cylindrical milling chamber in horizontal or vertical construction, which can be operated at a specific power density of more than 1.0 kW per liter of milling space, and whose stirrer tip speed is more than 12 m/s. The constructional design ensures that a sufficient milling energy is transferred to the millbase. Examples of mills suitable for this purpose are described in DE-C 3 716 587. If the milling intensity of the mill is too low, then the good properties according to the invention, in particular the high transparency and color strength and outstanding coloristics of the pigments, are not achieved. The energy output per unit time by the stirrer mechanism is transmitted to the millbase as disruption energy and as frictional energy in the form of heat. In order safely to dissipate this large quantity of heat, it is necessary to take constructional measures to keep the ratio of milling space to milling-chamber surface area (cooling area) as low as possible. At high throughputs, milling is carried out in circulation and the heat is dissipated to the outside predominantly via the millbase. Grinding media used include beads of zirconium oxide, zirconium mixed oxide, aluminum oxide or quartz with a diameter of less than or equal to 0.9 mm; it is judicious to use those having a diameter of from 0.2 to 0.9 mm, preferably from 0.3 to 0.5 mm.

When continuous stirrable mills are used for the fine division, the grinding media are separated from the millbase preferably by centrifugation, so that there is virtually no contact between the separation devices and the grinding media, thus making it possible to a large extent to prevent the separation devices becoming blocked. In this case, the stirred ballmills are operated with a high grinding media charge. In the case of the continuous stirred ballmills, the milling chamber is filled almost completely with grinding media.

Milling may be conducted in an aqueous, aqueous-organic, or organic medium. Preferably, milling is conducted without the addition of solvents in the aqueous-alkaline or neutral pH range. The pigment concentration in the millbase is dependent on the rheology of the suspension. It should be at below 30% by weight, generally from 5 to 25% by weight, preferably between 7.5 and 20% by weight.

The milling duration is dependent on the fineness requirements for the field of use in question. Accordingly, depending on the required fineness, the residence time of the millbase in the stirred ballmill is generally between 5 and 60 minutes. The residence time normally runs for a duration of from 10 to 45 minutes, preferably from 15 to 30 minutes.

Milling is conducted advantageously at temperatures in the range from 0 to 100° C., judiciously at a temperature between 10 and 60° C., preferably at from 20 to 50° C.

The liquid milling medium used is judiciously water, $C_1$–$C_8$ alkanols, advantageously water-miscible alkanols, such as methanol, ethanol, n-propanol, isopropanol, n-butanol, tert-butanol, isobutanol, pentanol, hexanol, alkylhexanols, ethylene glycol, propylene glycol or glycerol, for example; cyclic alkanols such as cyclohexanol, for example; $C_1$–$C_5$ dialkyl ketones such as acetone, diethyl ketone, methyl isobutyl ketone or methyl ethyl ketone, for example; ethers and glycol ethers such as dimethoxyethane, tetrahydrofuran, methyl glycol, ethyl glycol, butyl glycol, ethyl diglycol, methoxypropanol or methoxybutanol, for example; aliphatic acid amides such as dimethylacetamide or dimethylformamide, for example; cyclic carboxamides such as N-methylpyrrolidone, valerolactam and caprolactam, for example, heterocyclic bases such as pyridine, morpholine or picoline, for example; and also dimethyl sulfoxide, or mixtures of these solvents with water. Particular preference is given to water and solutions of $C_1$–$C_6$ alcohols in water.

In one preferred embodiment of the present invention, perylene-3,4,9,10-tetracarboxylic diimide in transparent pigment form is prepared by starting from peracid, as defined above, and ammonia and using per mole of peracid at least 2 times the molar amount of ammonia and an at least 3-fold amount by weight of water, based on the weight of the peracid, conducting the reaction at a temperature of from 50 to 200° C., and, preferably without isolation beforehand, wet-grinding the resulting crude pigment in a liquid medium, as described above, in a stirred ballmill which is operated with a power density of more than 1.0 kW per liter of milling space and a stirrer tip speed of more than 12 m/s under the action of grinding media with a diameter less than or equal to 0.9 mm, and isolating the resulting pigment.

The peracid in this case may be used in dry form or as a presscake. It is preferred to use from 5 to 15 times, in particular from 6 to 10 times, the amount by weight of water, based on the weight of the peracid. Preferably, from 2.5 to 10 times the molar amount, in particular from 3 to 6 times the molar amount, of ammonia is used per mole of peracid. The ammonia is added preferably in aqueous solution but may also be introduced in gas form. The reaction of the peracid with ammonia takes place preferably at a temperature between 100 and 180° C., under superatmospheric pressure if desired. After the end of the reaction, excess ammonia is removed judifiously by distillation, advantageously under atmospheric pressure and until a temperature of approximately 100° C. is reached at the distillation bridge. Although it is advantageous to remove all excess ammonia prior to the milling process, it is also possible not to remove the ammonia until later—for example, after the milling process, or not until during the isolation of the pigment.

The ammonia removed by distillation may be used again for a subsequent condensation reaction.

If desired, neutralization with a little acid is carried out prior to wet grinding and/or prior to filtration in order to rule out odor nuisance.

Besides the liquid phase and the crude pigment, the millbase may further comprise auxiliaries, such as surfactants, pigment dispersants, fillers, standardizers, resins, defoamers, antidust agents, extenders, shading colorants, preservatives, drying retardants, rheology control additives, or a combination thereof, for example.

The addition of the aforementioned auxiliaries may take place at one or more arbitrary points in time in the course of the overall pigment preparation process, preferably prior to condensation or prior to wet grinding, but also during condensation, during wet grinding, before or during isolation, before or during drying, or to the dry pigment (powder or granules), all at once or in two or more portions. The overall amount of the auxiliaries added may be from 0 to 40% by weight, preferably from 1 to 25% by weight, with particular preference from 5 to 15% by weight, based on the crude pigment.

Suitable surfactants include anionic or anion-active, cationic or cation-active, and nonionic substances, or mixtures of these agents. Preference is given to those surfactants or surfactant mixtures which do not foam during the distillation of the ammonia and in the course of the wet grinding.

Examples of suitable anion-active substances are fatty acid taurides, fatty acid N-methyl taurides, fatty acid isethionates, alkylphenylsulfonates, alkylnaphthalenesulfonates, alkylphenol polyglycol ether sulfates, fatty alcohol polyglycol ether sulfates, fatty acid amide polyglycol ether sulfates, alkylsulfosuccinamates, alkenylsuccinic monoesters, fatty alcohol polyglycol ether sulfosuccinates, alkanesulfonates, fatty acid glutamates, alkylsulfosuccinates, fatty acid sarcosides; fatty acids, e.g., palmitic, stearic and oleic acid; soaps, e.g., alkali metal salts of fatty acids, naphthenic acids and resin acids, e.g., abietic acid, alkali-soluble resins, e.g., rosin modified maleate resins and condensation products based on cyanuric chloride, taurine, N,N'-diethylaminopropylamine and p-phenylenediamine. Particular preference is given to resin soaps, i.e., alkali metal salts of resin acids.

Examples of suitable cationic substances are quaternary ammonium salts, fatty amine alkoxylates, alkoxylated polyamines, fatty amino polyglycol ethers, fatty amines, diamines and polyamines derived from fatty amines or fatty alcohols, and their alkoxylates, imidazolines derived from fatty acids, and salts of these cationic substances.

Examples of suitable nonionic substances are amine oxides, fatty alcohol polyglycol ethers, fatty acid polyglycol esters, betaines, such as fatty acid amide-N-propyl betaines, phosphoric esters of fatty alcohols or fatty alcohol polyglycol ethers, fatty acid amide ethoxylates, fatty alcohol-alkylene oxide adducts, and alkylphenol polyglycol ethers.

Pigment dispersants which may be used comprise compounds of the formula (II)

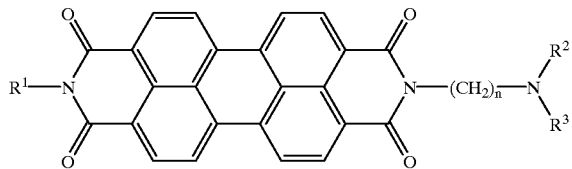

(II)

in which
R$^1$ is a hydrogen atom, a hydroxyl or amino group or a C$_0$–C$_8$ alkyl group which may be substituted by from 1 to 4 chlorine or bromine atoms or by a phenyl, cyano, hydroxyl, carbamoyl, C$_2$–C$_4$-acyl or C$_1$–C$_4$-alkoxy group or is perfluorinated or partly fluorinated;

R$^2$ and R$^3$ independently of one another are a hydrogen atom, a substituted or unsubstituted or partly fluorinated or perfluorinated alkyl group of 1 to 20 carbon atoms, or a substituted or unsubstituted or partly fluorinated or perfluorinated alkenyl group of 2 to 20 carbon atoms, it being possible for the substituents to be hydroxyl, phenyl, cyano, chlorine, bromine, C$_2$–C$_4$-acyl or C$_1$–C$_4$-alkoxy, or R$^2$ and R together with the nitrogen atom form a saturated, unsaturated or aromatic heterocyclic ring which if desired contains a further nitrogen, oxygen or sulfur atom in the ring; and n is a number from 1 to 6;

and/or compounds of the formula (III)

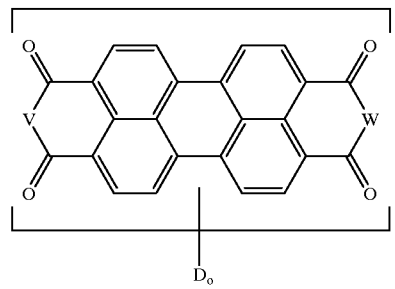

(III)

in which
V is a bivalent radical —O—, >NR$^4$ or >NR$^5$—Y$^-$X$^+$,

W is the bivalent radical >NR$^5$—Y$^-$X$^+$, o is a number from 0 to 8 and, if o>0, D is a chlorine or bromine atom and, where o>1, may be a combination thereof, R$^4$ is a hydrogen atom or a C$_1$–C$_{18}$-alkyl group, especially C$_1$–C$_4$-alkyl, or is a phenyl group which may be unsubstituted or substituted one or more times by halogen, C$_1$–C$_4$-alkyl, C$_1$–C$_4$-alkoxy or phenylazo, R⁵ is a $C_1$–$C_{18}$-alkylene group which within the C—C chain may be interrupted one or more times by a bridging link from the series —O—, —NR⁶—, —S—, phenylene, —CO—, —SO₂— or —CR⁷R⁸—or by a chemically rational combination thereof and in which the radicals R⁶, R⁷ and R⁸ independently of one another are each a hydrogen atom or a $C_1$–$C_4$-alkyl group which may be unsubstituted or substituted by a heterocyclic radical, preferably the imidazole or piperazine type, or R⁵ is a phenylene group which may be unsubstituted or substituted one or more times by $C_1$–$C_4$-alkyl or $C_1$–$C_4$-alkoxy, Y⁻ is one of the anionic radicals —SO₃⁻ or —COO—, and X⁺ has the definition H⁺ or the equivalent

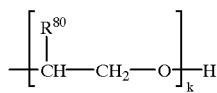

of a metal cation from main groups 1 to 5 or transition groups 1 or 2 or 4 to 8 of the Periodic Table of the Elements, m being one of the numbers 1, 2 or 3, or defines an ammonium ion N+R⁹R¹⁰R¹¹R¹², where the substituents R⁹, R¹⁰, R¹¹ and R¹² independently of one another are each a hydrogen atom or a group from the series $C_1$–$C_{30}$-alkyl, $C_2$–$C_{30}$-alkenyl, $C_5$–$C_{30}$-cycloalkyl, unsubstituted or $C_1$–$C_8$-alkylated phenyl, or a (poly)alkylenoxy group $$\left[\begin{array}{c}R^{80}\\|\\CH-CH_2-O\end{array}\right]_k H$$

in which R⁸⁰ is hydrogen or $C_1$–$C_4$-alkyl and k is a number from 1 to 30; and in which R⁹, R¹⁰, R¹¹ and R¹² as alkyl, alkenyl, cycloalkyl, phenyl or alkylphenyl may be substituted by amino, hydroxyl and/or carboxyl;

or where the substituents R⁹ and R¹⁰ together with the quaternary nitrogen atom may form a five- to seven-membered saturated ring system which if desired contains further heteroatoms;

or where the substituents R⁹, R¹⁰ and R¹¹ together with the quaternary nitrogen atom may form a five- to seven-membered aromatic ring system which if desired contains further heteroatoms and to which, if desired, additional rings are fused on;

and/or compounds of the formula (IV)

(IV)

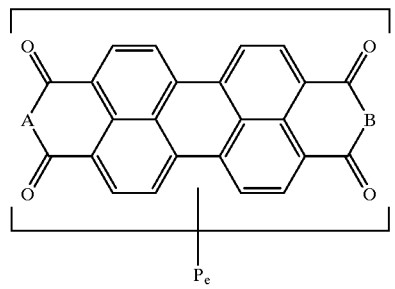

in which

A is a cationic bivalent radical of the formula

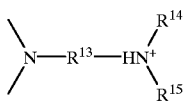

and

B is an anionic bivalent radical of the formula

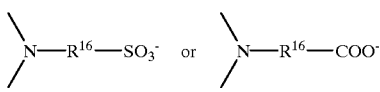

e is a number from 0 to 8 and, if e>0,

P is a chlorine or bromine atom and, where e>1, may be a combination thereof,

R¹³ is a $C_1$–$C_{12}$-alkylene group, a $(C_6$–$C_{10})$-aryl$(C_1$–$C_6)$-alkylene group or a $(C_6$–$C_{10})$-arylene group, R¹⁴ and R¹⁵ are identical or different and are a hydrogen atom, a substituted or unsubstituted $C_1$–$C_{20}$-alkyl radical or a substituted or unsubstituted $C_2$–$C_{20}$-alkenyl radical, or R¹⁴ and R¹⁵ together with the adjacent nitrogen atom form a heterocyclic ring system which if desired contains further heteroatom ring members N, S and/or O and to which, if desired, additional rings are fused on, and R¹⁶ is a straight-chain or branched $C_1$–$C_{12}$-alkylene group;

and/or compounds of the formula (V)

(V)

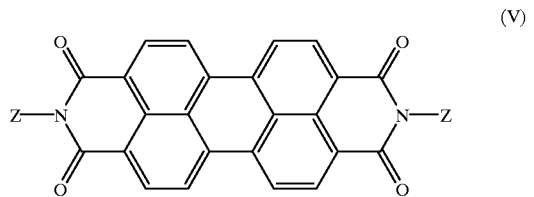

in which the two radicals Z are identical or different and Z has the definition Z¹, Z², Z³ or Z⁴, with the proviso that both radicals Z are not simultaneously Z⁴, where Z¹ is a radical of the formula (Va)

—[X—Y]$_{q-[x}$¹—Y¹]$_r$—[X²—NH]$_s$H     (Va)

in which

X, X¹ and X² are identical or different and are a branched or unbranched $C_2$–$C_6$-alkylene radical or a $C_5$–$C_7$-cycloalkylene radical which may be substituted by from 1 to 4 $C_1$–$C_4$-alkyl radicals, hydroxyl radicals, hydroxyalkyl radicals of 1 to 4 carbon atoms, and/or by 1 or 2 further $C_5$–$C_7$-cycloalkyl radicals;

Y and Y¹ are identical or different and are an NH—, —O—, N($C_1$–$C_6$-alkyl) group,

q is a number from 1 to 6;

r and s independently of one another are a number from 0 to 6, r and s not simultaneously being zero;
and in which
$Z^2$ is a radical of the formula (Vb)

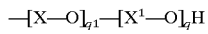 (Vb)

in which
q1 is a number from 0 to 6;
and in which
$Z^3$ is a radical of the formula (Vc)

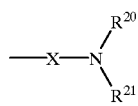 (Vc)

in which
$R^{20}$ and $R^{21}$ independently of one another are a hydrogen atom, a substituted or unsubstituted or partly fluorinated or perfluorinated alkyl group of 1 to 20 carbon atoms, or a substituted or unsubstituted or partly fluorinated or perfluorinated alkenyl group of 2 to 20 carbon atoms, it being possible for the substituents to be hydroxyl, phenyl, cyano, chlorine, bromine, $C_2$–$C_4$-acyl or $C_1$–$C_4$-alkoxy, or
$R^{20}$ and $R^{21}$ together with the nitrogen atom form a saturated, unsaturated or aromatic heterocyclic ring which if desired contains a further nitrogen, oxygen or sulfur atom in the ring; and
X is as defined above;
and in which
$Z^4$ is hydrogen, hydroxyl, amino, phenyl or $C_1$–$C_{20}$-alkyl, it being possible for the phenyl ring and the alkyl group to be substituted by one or more substituents from the group consisting of Cl, Br, CN, OH, $C_6H_5$, carbamoyl, $C_2$–$C_4$-acyl and $C_1$–$C_4$-alkoxy, and the phenyl ring may also be substituted by $NR^{20}R^{21}$, $R^{20}$ and $R^{21}$ being as defined above, or the alkyl group is perfluorinated or partly fluorinated.

Preferably, the pigment is isolated directly after wet grinding. It is also possible, however, to carry out an aftertreatment (finish) with water and/or an organic solvent, for example, at temperatures from 20 to 180° C. It is also possible to evaporate or spray-dry the pigment suspension present after grinding, so that filtration can be omitted.

The preparation of the perylimide pigments by the process of the invention takes place essentially without waste products. The few chemicals there are can be processed further or fully regenerated.

It was surprising and unforeseeable that the preparation of transparent perylimide pigments would be possible in this simple and technically elegant way without environmental problems, since in accordance with the known processes the preparation of transparent perylimide pigments is possible only in multistage processes and/or with considerable environmental burdens. In terms of their coloristic and performance properties, perylimide pigments prepared by the process of the invention are markedly superior to the pigments prepared by known processes.

Using the perylimide pigments prepared by the process of the invention it is possible to prepare automotive finishes, especially metallic finishes with high pigment concentration. Transparent and glossy coatings are obtained with very good fastness to overcoating, and weather fastness. The pigment concentrates (millbases) and the paints further possess very good flow properties, with a high pigment concentration and outstanding flocculation stability.

Perylimide pigments prepared in accordance with the invention are suitable for pigmenting high molecular mass natural or synthetic organic materials, such as cellulose ethers and cellulose esters, such as ethylcellulose, nitrocellulose, cellulose acetate, cellulose butyrate, natural resins or synthetic resins, such as addition polymerization resins or condensation resins, e.g., amino resins, especially urea-formaldehyde and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, individually or in mixtures.

In this context it is unimportant whether the abovementioned high molecular mass organic compounds are present in the form of plastic masses, melts, spinning solutions, varnishes, paints or printing inks. Depending on the intended use it is found advantageous to utilize the pigments obtained in accordance with the invention as blends or in the form of prepared formulations or dispersions. Based on the high molecular mass organic material to be pigmented, the pigments prepared in accordance with the invention are used in an amount of preferably from 0.05 to 30% by weight, more preferably from 0.1 to 15% by weight.

Using the pigments prepared by the process of the invention it is possible to pigment the stoving enamels customary in the art from the class of the alkyd melamine resin varnishes, acrylic melamine varnishes, polyester varnishes, high solid acrylic resin varnishes, aqueous varnishes based on polyurethane, and also two-component varnishes based on polyisocyanate crosslinkable acrylic resins, and especially automotive metallic varnishes.

The pigments prepared in accordance with the invention are also suitable as colorants in electrophotographic toners and developers, such as one or two component powder toners (also called one or two component developers), magnetic toners, liquid toners, polymerization toners, and specialty toners. Typical toner binders are addition polymerization, polyaddition and polycondensation resins, such as styrene, styrene acrylate, styrene butadiene, acrylate, polyester, phenolepoxy resins, polysulfones, polyurethanes, individually or in combination, and also polyethylene and polypropylene, which may include further ingredients, such as charge control agents, waxes or flow assistants, or may be modified subsequently with these additives.

Furthermore, the pigments prepared in accordance with the invention are suitable as colorants in powders and powder coating materials, especially in triboelectrically or electrokinetically sprayable powder coating materials, which are used to coat the surfaces of articles made, for example, of metal, wood, plastic, glass, ceramic, concrete, textile material, paper or rubber.

Typical powder coating resins used comprise epoxy resins, carboxyl- and hydroxyl-containing polyester resins, polyurethane resins and acrylic resins, together with customary hardeners. Resin combinations are also used. For example, epoxy resins are frequently used in combination with carboxyl- and hydroxyl-containing polyester resins. Typical hardener components (depending on the resin system) are, for example, acid anhydrides, imidazoles and also dicyandiamide and its derivatives, blocked isocyanates, bisacylurethanes, phenolic resins and melamine resins, triglycidyl isocyanurates, oxazolines, and dicarboxylic acids.

In addition, the pigments prepared in accordance with the invention are suitable as colorants in ink-jet inks on either an aqueous or nonaqueous basis, and also in those inks which operate in accordance with the hot-melt technique.

Furthermore, the pigments prepared in accordance with the invention are also suitable as colorants for color filters, and also for both additive and subtractive color generation.

In order to evaluate the properties in the coatings sector of the pigments prepared in accordance with the invention, a selection was made from among the large number of known varnishes of an alkyd-melamine resin varnish (AM) containing aromatic components and based on a medium-oil alkyd resin and on a butanol-etherified melamine resin, a polyester varnish (PE) based on cellulose acetobutyrate, a high-solid acrylic resin baking varnish based on a nonaqueous dispersion (HS), and a polyurethane-based aqueous varnish (PUR).

The color strength and shade were determined in accordance with DIN 55986. The rheology of the millbase after dispersion (millbase rheology) was evaluated on the basis of the following five-point scale:

5 highly fluid
4 liquid
3 viscous
2 slightly set
1 set

Following dilution of the millbase to the final pigment concentration, the viscosity was evaluated using the Rossmann viscospatula, type 301 from Erichsen. Gloss measurements were carried out on cast films at an angle of 20° in accordance with DIN 67530 (ASTMD 523) using the "multigloss" gloss meter from Byk-Mallinckrodt.

The solvent fastness was determined in accordance with DIN 55976.

The fastness to overcoating was determined in accordance with DIN 53221.

In the examples below, parts and percentages are based in each case on the weight of the substances so described.

EXAMPLES

Example 1

1000 parts of water are charged to a stirred pressure vessel and 100 parts of perylene-3,4,9,10-tetracarboxylic dianhydride and 60.5 parts of 25% strength aqueous ammonia solution are added with stirring. The mixture is heated to 150° C. and stirred at 150° C. under pressure for 5 hours. After cooling, the ammonia is removed by steam distillation. Then water is distilled off until the suspension is still just stirrable. The pH is adjusted to 12.1 using 10% strength aqueous sodium hydroxide solution.

This gives 1131 parts of 8.8% crude pigment suspension.

Example 1a 9.6 parts of an 18.4% condensation product based on cyanuric chloride, taurine, N,N'-diethylaminopropylamine and p-phenylenediamine are added to 200.8 parts of an 8.8% crude pigment suspension prepared in accordance with Example 1. The pH is adjusted to 12.1 using 10% strength aqueous sodium hydroxide solution. 100.9 parts of this suspension are introduced together with 360 parts of zirconium mixed oxide beads of diameter 0.3–0.4 mm as grinding media into a stirred ballmill (manufacturer: Draiswerke GmbH, Mannheim) and the charge is milled at a tip speed of 12.1 m/s and a power density of 1.3 kW/l of milling space at 20° C. for 15 minutes. Thereafter, the grinding media are separated from the millbase by sieving.

Grinding is repeated with a further 97.5 parts of this suspension and 360 parts of zirconium mixed oxide beads. The millbases separated from the beads are combined and adjusted to a pH of 1.9 using 10% strength aqueous hydrochloric acid, and then filtered off with suction, the solid product being washed with water and dried at 80° C.

This gives 16.6 parts of pigment.

In the PUR varnish, reddish violet, transparent and strongly colored coatings are obtained. The rheology is evaluated as being 4–5. The metallic coating is strongly and deeply colored.

Example 1b 94.1 parts of an 8.8% crude pigment suspension prepared in accordance with Example 1a are introduced together with 360 parts of zirconium mixed oxide beads of diameter 0.3–0.4 mm as grinding media into a stirred ballmill (manufacturer: Draiswerke GmbH, Mannheim) and the charge is milled at a tip speed of 15.7 m/s and a power density of 3.1 kW/l of milling space at 20° C. for 15 minutes. Thereafter, the grinding media are separated from the millbase by sieving.

Grinding is repeated with a further 91.7 parts of the crude pigment suspension and 360 parts of zirconium mixed oxide beads.

The two millbases separated from the beads are combined and adjusted to a pH of 1.9 using 10% strength aqueous hydrochloric acid, and then filtered off with suction, the solid product being washed with water and dried at 80° C.

This gives 14 parts of pigment.

In the PE varnish, reddish violet, transparent and strongly colored coatings are obtained. The rheology is evaluated as being 4, the gloss measurement gives a value of 57. The metallic coating is strongly and deeply colored.

Example 1c

To 201.7 parts of an 8.8% crude pigment suspension prepared in accordance with Example 1a, there are added 1.8 parts of pigment dispersant of the formula (III), in the bivalent radicals V and W of which formula $R^5$ is in each case an ethylene group, $Y^-$ is the radical $—CO_2^-$, $X^+$ is a proton, and o is the number 0. The pH is adjusted to 12.0 using 10% strength aqueous sodium hydroxide solution. 108.2 parts of this suspension together with 360 parts of zirconium mixed oxide beads of diameter 0.3–0.4 mm as grinding media into a stirred ballmill (manufacturer: Draiswerke GmbH, Mannheim) and the charge is milled at a tip speed of 15.7 m/s and a power density of 3.1 kW/l of milling space at 20° C. for 15 minutes. Thereafter, the grinding media are separated from the millbase by sieving. Grinding is repeated with a further 92.3 parts of this suspension.

The two millbases separated from the beads are combined and adjusted to a pH of 1.9 using 10% strength aqueous hydrochloric acid, and then filtered off with suction, the solid product being washed with water and dried at 80° C.

This gives 18.1 parts of pigment.

In the PUR varnish, reddish violet, transparent and strongly colored coatings are obtained. The rheology is evaluated as being 4–5. The metallic coating is strongly and deeply colored.

Example 2

Examples 2a and 2b are prepared in accordance with the process of the invention, Examples 2c to 2f in accordance with DE-A-20 43 820, which in comparison to the process of the invention discloses the use of conventional high speed stirred ballmills of low energy density.

Example 2a 10 parts of crude perylimide prepared in accordance with BIOS Final Report No. 1484 page 21, are suspended in 90 parts of water. The pH is adjusted to 12 using 10% strength aqueous sodium hydroxide solution. Following the addition of 360 parts of zirconium mixed oxide beads of diameter 0.3–0.4 mm as grinding media, the suspension is introduced into a stirred ballmill (manufacturer: Draiswerke GmbH, Mannheim) and milling is carried out with a tip speed of 15.7 m/s and a power density of 3.1 kW/l of milling space at 20° C. for 15 minutes. Subsequently, the grinding media are separated from the millbase by sieving, a pH of 1.8 is established using 10% strength aqueous hydrochloric acid, and then the millbase is filtered with suction and the solid product is washed with water and dried at 80° C.
This gives 9.4 parts of pigment.

Example 2b 10 parts of crude perylimide prepared in accordance with BIOS Final Report No. 1484 page 21, are suspended in 90 parts of 7% strength aqueous sodium hydroxide solution. Following the addition of 360 parts of zirconium mixed oxide beads of diameter 0.3–0.4 mm as grinding media, the suspension is introduced into a stirred ballmill (manufacturer: Draiswerke GmbH, Mannheim) and milling is carried out with a tip speed of 15.7 m/s and a power density of 3.1 kW/l of milling space at 20° C. for 15 minutes. Subsequently, the grinding media are separated from the millbase by sieving, a pH of 1.8 is established using 10% strength aqueous hydrochloric acid, and then the millbase is filtered with suction and the solid product is washed with water and dried at 80° C.
This gives 9.4 parts of pigment.

Example 2c (Comparative Example)

50 parts of crude perylimide prepared in accordance with BIOS Final Report No. 1484 page 21, are suspended in 260 parts of water and the pH is adjusted to 12 using 10% strength aqueous sodium hydroxide solution. Following the addition of 3045 parts of steel balls of diameter 2 mm as grinding media, the suspension is introduced into a stirred ballmill with disk stirring mechanism (manufacturer: Draiswerke GmbH, Mannheim) and milling is carried out with a peripheral speed of 10.2 m/s and a power density of 0.45 kW/l of milling space at 20° C. for 75 minutes. Subsequently, the grinding media are separated from the millbase by sieving, a pH of 1.8 is established using 10% strength aqueous hydrochloric acid, and then the millbase is filtered with suction and the solid product is washed with water and dried at 80° C.
This gives 45 parts of pigment.

Example 2d (Comparative Example)

Example 2c is repeated except that milling is carried out for only 15 minutes.
This gives 45 parts of pigment.

Example 2e (Comparative Example)

70 parts of crude perylimide prepared in accordance with BIOS Final Report No. 1484 page 21, are suspended in 451 parts of 7% strength aqueous sodium hydroxide solution. Following the addition of 3045 parts of steel balls of diameter 2 mm as grinding media, the suspension is introduced into a stirred ballmill with disk stirring mechanism (manufacturer: Draiswerke GmbH, Mannheim) and milling is carried out with a peripheral speed of 10.2 m/s and a power density of 0.45 kW/l of milling space at 20° C. for 75 minutes. Subsequently, the grinding media are separated from the millbase by sieving, a pH of 1.8 is established using 10% strength aqueous hydrochloric acid, and then the millbase is filtered with suction and the solid product is washed with water and dried at 80° C.
This gives 60 parts of pigment.

Example 2f (Comparative Example)

Example 2e is repeated except that milling is carried out for only 15 minutes.
This gives 60 parts of pigment.

Example 2g

The pigments prepared in accordance with Examples 2a to 2f are used to produce coatings in the HS varnish. The coatings of the pigments from Examples 2a and 2b, prepared by the process of the invention, in comparison to the coatings of pigments from Examples 2c to 2f, are more transparent in the masstone, more strongly colored in the reduction, and more strongly and deeply colored in the metallic. When the process according to DE-A 20 43 820 is used, accordingly, even with a grinding period three times as long (Examples 2c and 2e) and much higher concentrations of sodium hydroxide solution (Examples 2e and 2f), in comparison to the process of the invention, products are obtained whose properties are markedly inferior.

Example 3

10 parts of crude perylimide prepared in accordance with BIOS Final Report No. 1484 page 21, and 2.2 parts of presscake (23.2%) of pigment dispersant prepared in accordance with EP-A-0 321 919 Example 17 are suspended in 88.3 parts of water. The pH is adjusted to 12.1 using 10% strength aqueous sodium hydroxide solution. Following the addition of 360 parts of zirconium mixed oxide beads of diameter 0.3–0.4 mm as grinding media, the suspension is introduced into a stirred ballmill (manufacturer: Draiswerke GmbH, Mannheim) and milling is carried out at a tip speed of 15.7 m/s at 20° C. for 15 minutes. Milling is repeated a second time and the suspensions are combined. Thereafter, the grinding media are separated from the millbase by sieving, after which the millbase is filtered with suction and the solid product is washed with water and dried at 80° C.
This gives 20.2 parts of pigment.
In the HS varnish, reddish violet, transparent and strongly colored coatings are obtained. The rheology was evaluated as being 4–5, the gloss measurement gives a value of 77. The metallic coating is strongly and deeply colored.

Example 4

A stirred pressure vessel is charged with 1300 parts of water, and 130 parts of perylene-3,4,9,10-tetracarboxylic dianhydride and 78.6 parts of 25% strength aqueous ammonia solution are added with stirring. The mixture is heated to 150° C. and stirred under pressure at 150° C. for 5 hours. After cooling, the ammonia is removed by steam distillation. The crude pigment is filtered, washed and dried at 80° C.
This gives 127 g of crude perylimide.

Example 4a 10 parts of crude perylimide prepared in accordance with Example 4 are suspended in 85.5 parts of water and 4.5 parts of ethanol. Following the addition of 360 parts of zirconium mixed oxide beads of diameter 0.3–0.4 mm as grinding media, the suspension is introduced into a stirred ballmill (manufacturer: Draiswerke GmbH, Mannheim) and milling is carried out at a tip speed of 15.7 m/s at 20° C. for 15 minutes. Milling is repeated three times and the suspensions are combined. Thereafter, the grinding media are separated from the millbase by sieving and the pH is adjusted to 2 using 10% strength aqueous hydrochloric acid. Then the millbase is filtered with suction and the solid product is washed with water and dried at 80° C.

This gives 39.1 parts of pigment.

19.5 parts of the pigment are mixed mechanically with 1.95 parts of pigment dispersant prepared in accordance with EP-A-0937724 Example 2. Using this pigment preparation, in the HS varnish, reddish violet and strongly colored coatings are obtained. The rheology is evaluated as being 4, the gloss measurement gives a value of 75, and the viscosity is 1.1 sec. The metallic coating is strongly and deeply colored.

Example 4b 10 parts of crude perylimide prepared in accordance with Example 4 are suspended in 85.5 parts of water and 4.5 parts of N-methylpyrrolidone. Following the addition of 360 parts of zirconium mixed oxide beads of diameter 0.3–0.4 mm as grinding media, the suspension is introduced into a stirred ballmill (manufacturer: Draiswerke GmbH, Mannheim) and milling is carried out at a tip speed of 15.7 m/s at 20° C. for 15 minutes. Milling is repeated three times and the suspensions are combined. Thereafter, the grinding media are separated from the millbase by sieving and the pH is adjusted to 2 using 10% strength aqueous hydrochloric acid. Then the millbase is filtered with suction and the solid product is washed with water and dried at 80° C.

This gives 39 parts of pigment.

In the HS varnish, reddish violet and strongly colored coatings are obtained. The rheology is evaluated as being 4–5. The metallic coating is strongly and deeply colored. In the PUR varnish, reddish violet and strongly colored coatings are likewise obtained, the rheology is evaluated as being 5, and the metallic coating is strongly and deeply colored.

Example 5

10 parts of crude perylimide prepared in accordance with BIOS Final Report No. 1484 page 21, and 0.5 part of pigment dispersant prepared in accordance with EP-A-0937724 Example 4 are suspended in 90 parts of water. The pH is adjusted to 12.4 using 10% strength aqueous sodium hydroxide solution. Following the addition of 360 parts of zirconium mixed oxide beads of diameter 0.3–0.4 mm as grinding media, the suspension is introduced into a stirred ballmill (manufacturer: Draiswerke GmbH, Mannheim) and milling is carried out at a tip speed of 15.7 m/s at 20° C. for 15 minutes. Milling is repeated a second time and the suspensions are combined. Thereafter, the grinding media are separated from the millbase by sieving and the pH is adjusted to 2 using 10% strength aqueous hydrochloric acid. Then the millbase is filtered with suction and the solid product is washed with water and dried at 80° C.

This gives 20.0 parts of pigment.

In the PUR varnish, reddish violet, transparent and strongly colored coatings are obtained. The rheology is evaluated as being 4. The metallic coating is strongly and deeply colored.

What is claimed is:

1. A process for preparing transparent perylimide pigments of the formula (I)

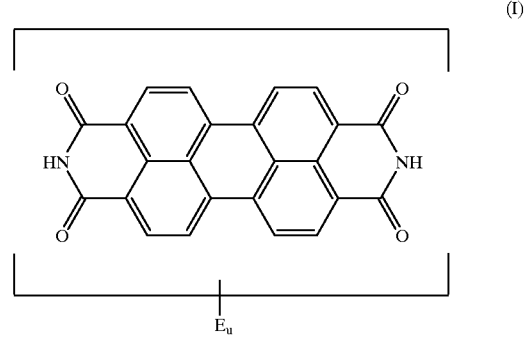

in which u is a number from 0 to 8 and, if u>0,

E is a chlorine or bromine atom and, where u>1, is a chlorine or bromine atom or combinations thereof, which comprises wet-grinding a crude perylimide pigment in a liquid medium in a stirred ballmill operated at a power density of from 1.0 kW per liter of milling space and at a stirrer tip speed of more than 12 m/s under the action of grinding media having a diameter of less than or equal to 0.9 mm, and isolating the resulting pigment.

2. The process as claimed in claim 1, wherein the crude perylimide pigment has been prepared by melting 1,8-naphthalenedicarboximide with an alkali metal hydroxide to give a leuco form and oxidizing the leuco form, or by condensing perylene-3,4,9-10-tetracarboxylic acid, its salt or its anhydride with ammonia.

3. The process as claimed in claim 1, wherein wet grinding is conducted in an aqueous alkaline or neutral pH range.

4. The process as claimed in claim 1, wherein wet grinding is conducted from 5 to 60 minutes.

5. The process as claimed in claim 2, wherein perylene-3,4,9,10-tetracarboxylic acid, its salt or its anhydride is reacted with at least 2 times the molar amount of ammonia and an at least 3-fold amount by weight of water, based on the weight of the perylene-3,4,9,10-tetracarboxylic acid, its salt or its anhydride, at a temperature of from 50 to 200° C. and the resulting crude pigment is subjected to wet grinding in a liquid medium in a stirred ballmill operated at a power density of from 1.0 kW per liter of milling space and at a stirrer tip speed of more than 12 m/s under the action of grinding media having a diameter of less than or equal to 0.9 mm, and isolating the resulting pigment.

6. The process as claimed in claim 5, wherein from 3 to 6 times the molar amount of ammonia per mole of perylene-3,4,9,10-tetracarboxylic acid, its salt or its anhydride is used.

7. The process as claimed in claim 5, wherein from 5 to 15 times the amount by weight of water, based on the weight of perylene-3,4,9,10-tetracarboxylic acid, its salt or its anhydride, is used.

8. The process as claimed in claim 5, wherein excess ammonia is distilled off before wet grinding.

9. The process as claimed in claim 5, wherein the crude pigment in form of a suspension is passed on for wet grinding without being isolated.

10. A transparent perylimide pigment formed in accordance with the process of claim 1.

* * * * *